United States Patent
Skalicky et al.

(10) Patent No.: US 9,885,788 B2
(45) Date of Patent: Feb. 6, 2018

(54) SATELLITE SUBSET SELECTION FOR USE IN MONITORING THE INTEGRITY OF COMPUTED NAVIGATION SOLUTIONS

(71) Applicant: Honeywell International Inc., Morristown, NJ (US)

(72) Inventors: Jakub Skalicky, Brno (CZ); Martin Orejas, Brno (CZ); Jussi Raasakka, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 303 days.

(21) Appl. No.: 14/658,372

(22) Filed: Mar. 16, 2015

(65) Prior Publication Data

US 2016/0274242 A1    Sep. 22, 2016

(51) Int. Cl.
*G01S 19/20* (2010.01)
*G01S 19/28* (2010.01)

(52) U.S. Cl.
CPC .............. *G01S 19/28* (2013.01); *G01S 19/20* (2013.01)

(58) Field of Classification Search
CPC .......... G01S 19/28; G01S 19/20; G01S 19/40; G01S 19/41; G01S 19/42; G01S 19/421;
(Continued)

(56) References Cited

U.S. PATENT DOCUMENTS 6,639,549 B2 * 10/2003 Vanderwerf ............ G01S 19/20
                                                    342/357.58
8,014,948 B2 *  9/2011 Vanderwerf ............ G01S 19/20
                                                    342/357.59
(Continued)

FOREIGN PATENT DOCUMENTS

CN    101520503    7/2011
CN    102540213    10/2013
CN    103592658    2/2014

OTHER PUBLICATIONS

Dr Young et al.: "Investigation of Extending Receiver Autonomous Integrity Monitoring (RAIM) to Combined Use of Galileo and Modernized GPS", Ion GNSS 17th Int.Technical Meeting of the Satellite Division, Sep. 21, 2004 (Sep. 21, 2004), pp. 1691-1698, XP055185607).*

(Continued)

*Primary Examiner* — Bernarr E Gregory
*Assistant Examiner* — Nuzhat Pervin
(74) *Attorney, Agent, or Firm* — Fogg & Powers LLC (57) ABSTRACT

Embodiments for satellite subset selection for use in monitoring the integrity of computed navigation solutions are disclosed. In one embodiment, a Global Navigation Satellite System (GNSS) receiver comprises: a processing device configured to: group a plurality of satellites in view of the GNSS receiver into a plurality of subsets, wherein a satellite of the plurality of satellites is included in at most one subset of the plurality of subsets, wherein each subset of the plurality of subsets includes at least one satellite of the plurality of satellites and less than all satellites of the plurality of satellites, and wherein at least one subset includes more than one satellite; calculate a plurality of navigation sub-solutions, wherein each navigation sub-solution of the plurality of navigation sub-solutions is calculated with at least one different subset of the plurality of subsets excluded; and calculate a protection level.

20 Claims, 4 Drawing Sheets

(58) Field of Classification Search
CPC .... G01S 19/423; G01S 19/425; G01S 19/426; G01S 19/04; G01S 19/08; G01S 19/07; G01S 19/39
USPC .................................................. 342/357.67
See application file for complete search history.

(56) References Cited

U.S. PATENT DOCUMENTS

| | | | | |
|---|---|---|---|---|
| 8,085,196 | B2 | 12/2011 | Whitehead | |
| 8,094,069 | B2* | 1/2012 | Rang | G01S 19/20 342/357.58 |
| 8,106,823 | B2* | 1/2012 | Schroth | G01S 19/20 342/357.67 |
| 8,193,976 | B2* | 6/2012 | Shen | G01S 19/42 342/357.23 |
| 8,659,474 | B2* | 2/2014 | Dai | G01S 19/04 342/357.44 |
| 8,717,234 | B2* | 5/2014 | Laine | G01S 19/08 342/357.395 |
| 8,976,064 | B2* | 3/2015 | Brenner | G01S 19/07 342/357.24 |
| 9,146,320 | B2* | 9/2015 | Najim | G01S 19/20 |
| 9,244,172 | B2* | 1/2016 | O'Connor | G01S 19/05 |
| 9,411,051 | B2* | 8/2016 | Sagiraju | G01S 19/28 |
| 9,488,734 | B2* | 11/2016 | Davain | G01S 19/20 |
| 2003/0231132 | A1* | 12/2003 | Park | G01S 19/28 342/357.25 |
| 2008/0186229 | A1 | 8/2008 | Van Diggelen et al. | |
| 2014/0232595 | A1* | 8/2014 | Rife | G01S 19/20 342/357.58 |
| 2014/0240171 | A1* | 8/2014 | Cho | G01S 19/08 342/357.51 |
| 2015/0145719 | A1* | 5/2015 | Dunik | G01S 19/28 342/357.22 |
| 2015/0145724 | A1* | 5/2015 | Kana | G01S 19/20 342/357.58 |
| 2016/0216378 | A1 | 7/2016 | Davain | |
| 2016/0274242 | A1 | 9/2016 | Skalicky et al. | |
| 2017/0139052 | A1 | 5/2017 | Skalicky et al. | |

OTHER PUBLICATIONS

Castaldo et al., "P-RANSAC: An Integrity Monitoring Approach for GNSS Signal Degraded Scenario", "International Journal of Navigation and Observation", 2014, pp. 112, vol. 2014, Publisher: Hindawi Publishing Corporation.

Lee, Young C., "New Advanced RAIM with Improved Availability for Detecting Constellation-wide Faults, Using Two Independent Constellations", "Journal of the Institute of Navigation", Spring 2013, pp. 71-83, vol. 60, No. 1, Publisher: Institute of Navigation.

Liu et al., "A Recursive Quasi-optimal Fast Satellite Selection Method for GNSS Receivers", 2009, pp. 1-11, Publisher: School of Information and Electronics, Beijing Institute of Technology.

Miaoyan et al., "Satellite Selection for Multi-Constellation", 2008, pp. 1053-1059, Publisher: IEEE.

Rippl, Markus, "Real Time Advance Receiver Autonomous Integrity Monitoring in DLR's Multi-Antenna GNSS Receiver", "International Technical Meeting (ITM) of the Institute of Navigation", Jan. 30-Feb. 1, 2012, p. 1767-1776, Published in: Newport Beach, CA.

Walter et al., "Reduced Subset Analysis for Multi-Constellation ARAIM", "Institute of Navigation (ION) International Technical Meeting", 2014, pp. 110.

European Patent Office, "Communication under Rule 71(3) EPC from EP Application No. 16158851.2 dated Jan. 9, 2017", "from Foreign Counterpart of U.S. Appl. No. 14/658,372", Jan. 9, 2017, pp. 129, Published in: EP.

European Patent Office, "Extended European Search Report from EP Application No. 16196671.8 dated Apr. 19, 2017", "from Foreign Counterpart of U.S. Appl. No. 15/221,399", Apr. 19, 2017, pp. 19, Published in: EP.

Orejas et al., "Implementation and Testing of Clustered ARAIM in a GPS/Galileo Receiver | Technical Program ION (abstract)", "Retrieved Aug. 25, 2016 from https://www.ion.org/gnss/abstracts.cfm?paperID=4426", "Sep. 14, 2016", pp. 1-4, Publisher: Institute of Navigation.

Orejas et al., "Multiconstellation GNSS/INS to Support LPV200 Approaches and Autolanding", "25th International Technical Meeting of the Satellite Division of the Institute of Navigation", Sep. 17-21, 2012, pp. 790-803, Published in: Nashville, TN.

Schroth et al., "Enhancements of the Range Consensus Algorithm (RANCO)", "GNSS 2008—Proceedings of the 21st International Technical Meeting of the Satellite Division of the Institute of Navigation", Sep. 19, 2008, pp. 93-103, Publisher: The Institute of Navigation, Published in: Manassas, VA.

European Patent Office, "Extended European Search Report from EP Application No. 16158851.2 dated Jul. 5, 2016", "from Foreign Counterpart of U.S. Appl. No. 14/658,372", Jul. 5, 2016, pp. 17, Published in: EP.

Skalicky et al., "Smart Satellite Distribution Into ARAIM Clusters for Use in Monitoring Integrity of Computed Navigation Solutions", "U.S. Appl. No. 15/221,399, filed Jul. 27, 2016", Jul. 27, 2016, pp. 1-37, Published in: US.

Blanch et al., "Advanced RAIM User Algorithm Description: Integrity Support Message Processing, Fault Detection, Exclusion, and Protection Level Calculation", "Proceedings of the 25th International Technical Meeting of The Satellite Division of the Institute of Navigation", Dec. 2013, pp. 1-23, Publisher: ION GNSS 2012, Published in: Nashville, TN.

Kana et al., "Architectures for High Integrity Multi-Constellation Solution Separation", "Proceedings of the 27th International Technical Meeting of the ION Satellite Division, ION GNSS+ 2014, Sep. 8-12, 2014", Sep. 2014, pp. 3554-3565.

Lee, "Investigation of Extending Receiver Autonomous integrity Monitoring (RAIM) to Combined Use of Galileo and Modernized GPS", "ION GNSS 17th International Technical Meeting of the Satellite Division, Sep. 21-24, 2004", Sep. 2004 , pp. 1691-1698, Published in: Long Beach, CA.

Roongpiboonsopit et al., "A Multi-Constellations Satellite Selection Algorithm for Integrated Global Navigation Satellite Systems", "Retrived on Dec. 21, 2015 from web address http://dx.doi.org/10.1080/15472450903084238", Mar. 10, 2009, pp. 1-16.

Simon et al., "Advanced RAIM scheme and its evaluation for non-aeronautical users in different environments", "23rd International Technical Meeting of the Satellite Division of the Institute of Navigation, Sep. 21-24, 2010", Sep. 2010, pp. 292-300, Published in: Portland, OR.

Su et al., "Receiver Autonomous Integrity Monitoring Availability and Fault Detection Capability Comparison Between BeiDou and GPS", May 2014, pp. 313-324.

Tu et al., "Evaluation of GNSS Receiver Autonomous Integrity Monitoring for Multiple Outliers With a Smart Random Sample Consensus Strategy", "Geoinformatics 2011, 19th International Conference", Jul. 2011, pp. 16, Publisher: IEEE, Published in: US.

Zhang et al., "A Fast Satellite Selection Algorithm: Beyond Four Satellites", Oct. 2009, pp. 740-747, vol. 3, No. 5, Publisher: ISSS Journal of Selected Topics in Signal Processing.

Zhang et al., "Enhancements of the Satellite Selection Method for Multi-Constellation GNSS Using Convex Geometry", "Radar Conference 2013", Aug. 2013, pp. 1-8, Publisher: IET International.

* cited by examiner

SATELLITE SUBSET SELECTION FOR USE IN MONITORING THE INTEGRITY OF COMPUTED NAVIGATION SOLUTIONS

BACKGROUND

Several Global Navigation Satellite System (GNSS) applications, such as safety critical applications, require that a GNSS receiver monitor the integrity of the GNSS receiver's computed solution. The integrity of a computed solution is the level of trust that can be placed in the correctness of the computed solution. Monitoring the integrity of a computed solution protects users from position errors that arise from bad geometries, satellite faults, etc. that are not yet identified by the system ground monitoring network.

Current integrity monitoring schemes, such as Receiver Autonomous Integrity Monitoring (RAIM), determine whether there is a fault in a satellite measurement by examining the consistency of a set of redundant measurements. One way to do this is by using the solution separation method. The solution separation method for RAIM is based on computing the difference between a full navigation solution that is rendered using all N visible satellites and a set of navigation sub-solutions that are rendered using N−1 visible satellites. In computing the set of navigation sub-solutions, RAIM assumes only one satellite fault at a time. However, with the introduction of new constellations (e.g. Galileo, BeiDou) and the continuing use of existing constellations (e.g., the Global Positioning System (GPS) system, GLONASS), it is more likely that there could be multiple simultaneous satellite faults at a given time. Furthermore, entire constellation faults will also need to be considered by future integrity monitoring schemes.

In response to the likelihood of more than one fault occurring at the same time, Advanced Receiver Autonomous Integrity Monitoring (ARAIM) was developed. ARAIM is based on the solution separation method but it was modified to include multiple faults and constellation faults. For each fault that needs to be monitored, a navigation sub-solution that does not include the fault-associated measurements is created. For example, if dual faults (two simultaneous single faults) need to be monitored then a set of sub-solutions based on removing all possible combinations of 2 satellites needs to be created. Increasing the number of visible satellites and higher probabilities of simultaneous faults (as expected from new constellations), however, can dramatically increase the number of sub-solutions that need to be created. This, in turn, will have a large impact on the computational demands of the algorithm resulting in more expensive chips.

For the reasons stated above and for the reasons stated below which will become apparent to those skilled in the art upon reading and understanding the specification, there is a need in the art for improved systems and methods for considering the possibility of multiple satellite faults and entire constellation faults at the same time, while reducing the computational load for processors for considering these possibilities.

SUMMARY

Embodiments for satellite subset selection for use in monitoring the integrity of computed navigation solutions are disclosed. In one embodiment, a Global Navigation Satellite System (GNSS) receiver comprises: a processing device configured to: group a plurality of satellites in view of the GNSS receiver into a plurality of subsets, wherein a satellite of the plurality of satellites is included in at most one subset of the plurality of subsets, wherein each subset of the plurality of subsets includes at least one satellite of the plurality of satellites and less than all satellites of the plurality of satellites, and wherein at least one subset includes more than one satellite; calculate a plurality of navigation sub-solutions, wherein each navigation sub-solution of the plurality of navigation sub-solutions is calculated with at least one different subset of the plurality of subsets excluded; and calculate a protection level.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As described above, ARAIM takes into consideration multiple simultaneous faults. However, the computational load for a processor for considering these multiple simultaneous faults is demanding. For example, if there are 40 satellites in view of a multi-constellation receiver, which is a reasonable scenario with four constellations in use, and up to three faults are to be considered, there are $_{40}C_{39}+_{40}C_{38}+_{40}C_{37}=10,700$ sub-solutions that need to be computed by the ARAIM algorithm. The embodiments disclosed herein reduce the number of sub-solutions that are computed by grouping the satellites into a plurality of subsets. For example, assume there are a total of 40 satellites in view of a GNSS receiver, wherein the 40 satellites include satellites from four constellations, ten satellites from each constellation. In one exemplary embodiment, the 40 visible satellites can be grouped into eight subsets with five satellites in each subset. Now, if up to three faults were considered, there would be $_8C_7+_8C_6+_8C_5=92$ sub-solutions that need to be computed, thereby dramatically reducing the computational load for a processor. As can be seen from this exemplary embodiment and other exemplary embodiments discussed below, this method results in a fixed number of subsets that are computed. As a result, the Worst Case Execution Time (WCET), which is crucial for safety critical applications, is easier to determine. Furthermore, increasing the number of visible satellites would have a limited impact in the WCET.

Figure 1A:
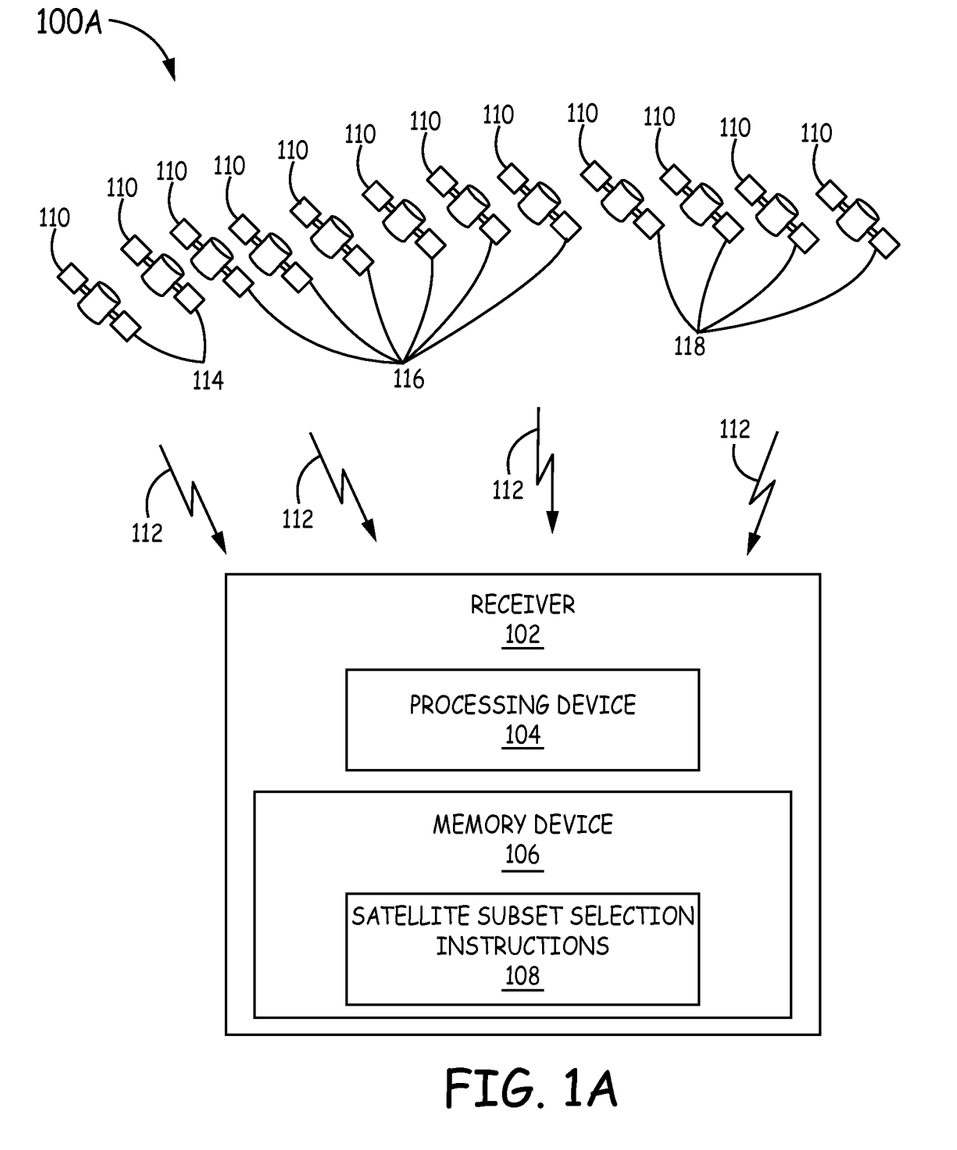
FIGS. 1A-1C are block diagrams of example systems for satellite subset selection for use in monitoring the integrity of computed navigation solutions.
Figure 1B:
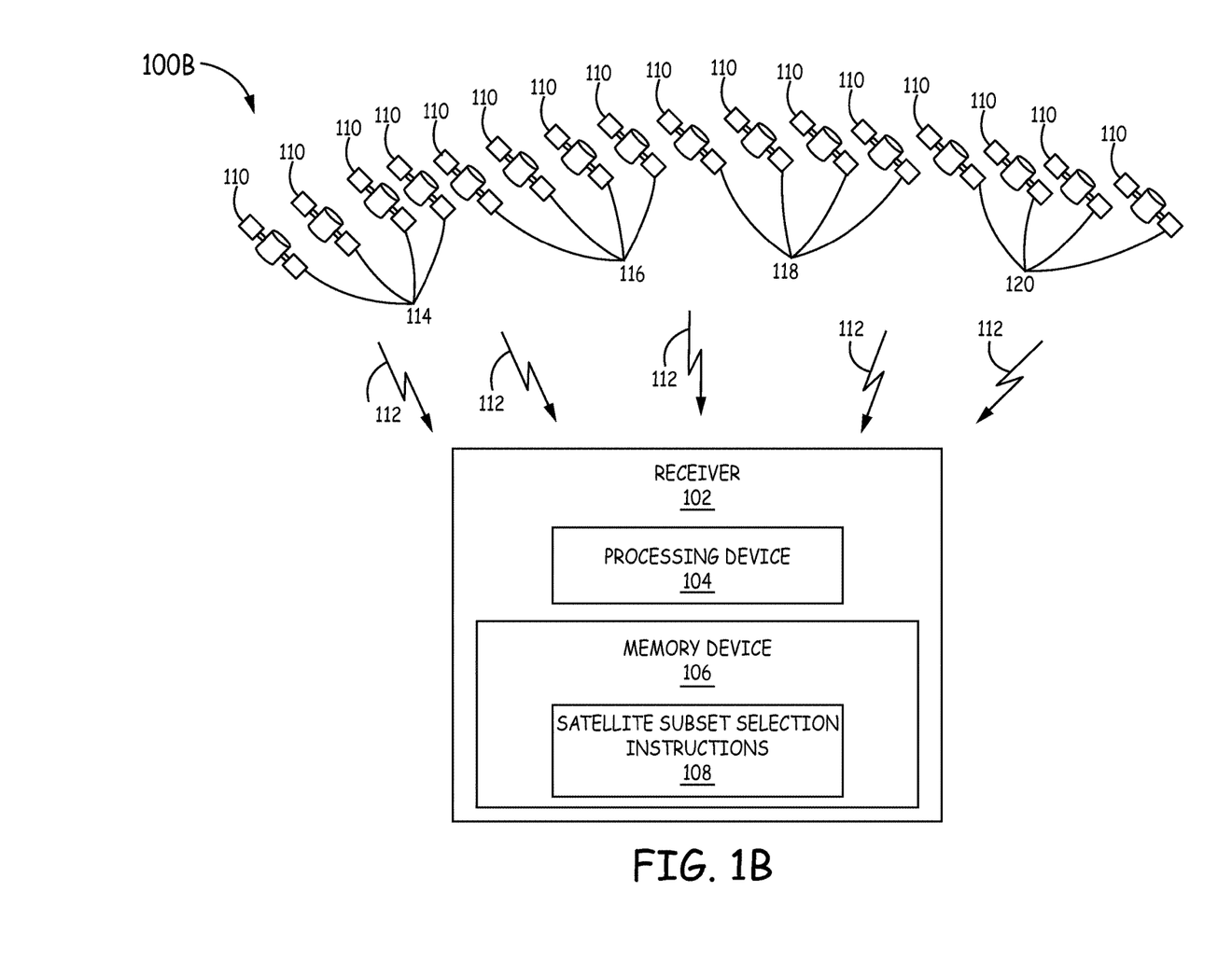
Figure 1C:
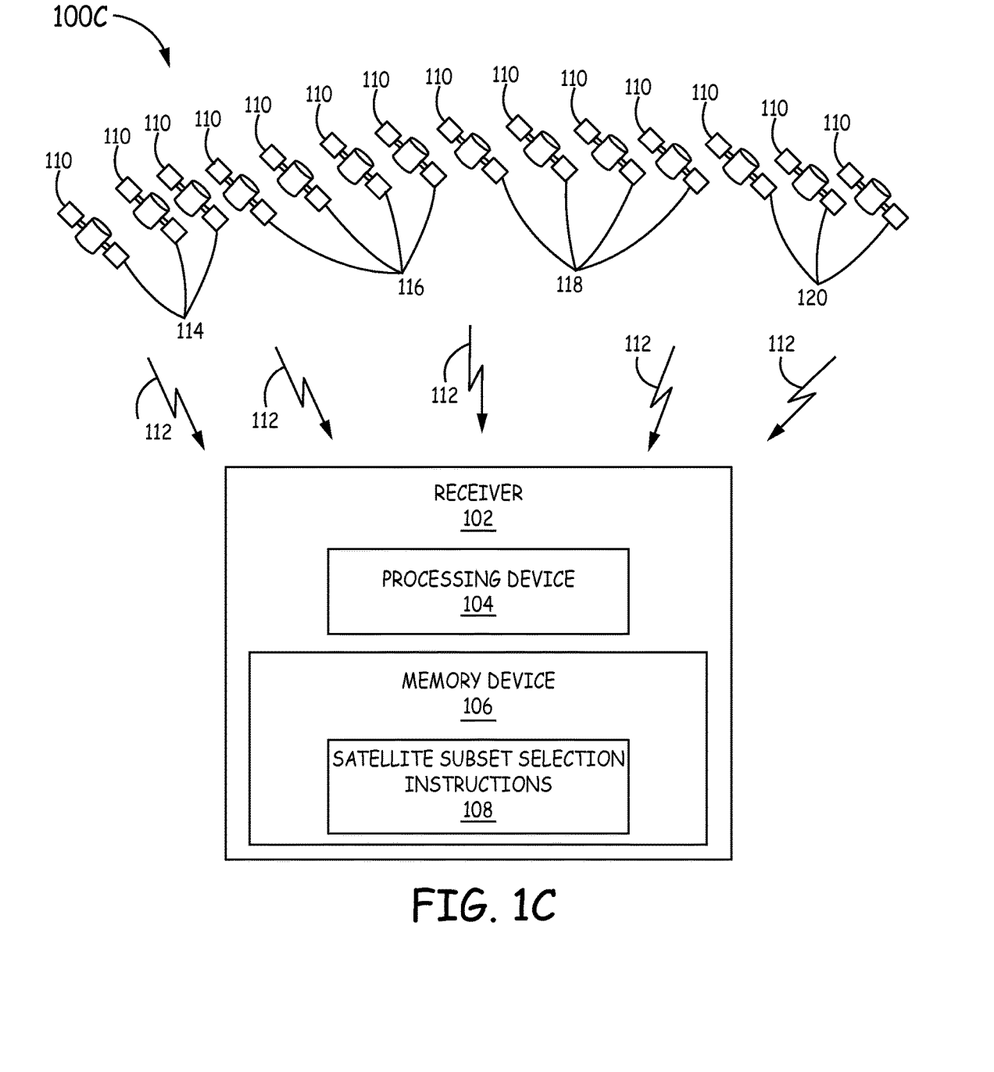

FIGS. 1A-1C are block diagrams of example systems 100A-100C for satellite subset selection for use in monitoring the integrity of computed navigation solutions. The systems 100A-100C include a plurality of satellites 110 in view of a GNSS receiver 102. In some exemplary embodiments, the plurality of satellites 110 can include satellites from more than one constellation, such as GPS, GLONASS, Galileo, BeiDou, etc. However, in some other exemplary embodiments, the plurality of satellites 110 can all be from a single constellation. Furthermore, the systems 100A-100C include the GNSS receiver 102 that receives signals 112 from one or more of the satellites 110 in the plurality of satellites 110. The received signals 112 can be used by the receiver 102 to calculate a navigation solution for the receiver 102 according to methods known to one having skill in the art. A navigation solution can include, but is not limited to, a position, a velocity, and/or a time of the receiver 102.

Referring to FIG. 1A, in exemplary embodiments, the receiver 102 includes a processing device 104 that can execute satellite subset selection instructions 108 stored in a memory device 106 in order to group the plurality of satellites 110 into a plurality of subsets 114, 116, 118. How the plurality of satellites 110 will be divided in subsets 114, 116, 118 can depend on several factors including, but not limited to, the number of satellites and constellations available, the probabilities of satellite and constellation faults, integrity requirements, available processing power of the receiver, etc. For example, with a fewer number of visible satellites 110, fewer satellites 110 may be included in each subset 114, 116, 118 to meet certain integrity requirements of the navigation sub-solutions that are computed using the subsets 114, 116, 118.

As stated above, the processing device 104 is configured to group the satellites 110 into different numbers of subsets 114, 116, 118. While three subsets 114, 116, 118 are shown in FIG. 1A and four subsets 114, 116, 118, 120 are shown in FIGS. 1B and 1C, the number of subsets 114, 116, 118, 120 can be any number greater than one as long as each subset 114, 116, 118, 120 includes at least one satellite 110, less than the total number of satellites 110 in the plurality of satellites 110, and at least one subset includes more than one satellite, wherein each satellite 110 is included in at most one subset 114, 116, 118, 120. FIG. 1A is one exemplary embodiment showing a possible configuration. In FIG. 1A, there are a plurality of subsets 114, 116, 118 and the number of satellites 110 included in each subset 114, 116, 118 is greater than one, less than the total number of satellites 110 in the plurality of satellites 110, and each satellite 110 is included in at most one subset 114, 116, 118.

In addition to the configuration above shown in FIG. 1A, in some exemplary embodiments, the processing device 104 can be further configured to equally divide the plurality of satellites 110 into the plurality of subsets 114, 116, 118, 120 if the number of subsets 114, 116, 118, 120 is a divisor of the number of satellites 110, as shown in FIG. 1B. Since the system 100B includes four subsets 114, 116, 118, 120 and sixteen satellites 110, the number of subsets 114, 116, 118, 120 is a divisor of the number of satellites 110, so each subset 114, 116, 118, 120 can include an equal number of satellites 110. However, even when the number of subsets 114, 116, 118, 120 is a divisor of the number of satellites 110, the satellites 110 do not have to be divided equally among the subsets 114, 116, 118, 120, as shown in FIG. 1A.

Furthermore, in some other exemplary embodiments, the processing device 104 can be configured to group the plurality of satellites 110 into the plurality of subsets 114, 116, 118, 120, wherein each subset 114, 116, 118, 120 of the plurality of subsets 114, 116, 118, 120 includes a number of satellites within plus or minus one of any other subset 114, 116, 118, 120 of the plurality of subsets 114, 116, 118, 120, as shown in FIG. 1C. For example, the system's 100C subsets 114, 120 include only one satellite 110 less than subsets 116, 120. In some embodiments, the processing device 104 can be configured this way when the number of subsets 114, 116, 118, 120 is not a divisor of the number of satellites 110 in the plurality of satellites 110. While the satellites 110 in each subset 114, 116, 118, 120 are shown in FIGS. 1A-1C as being adjacent to one another, in other embodiments, the satellites 110 in a given subset 114, 116, 118, 120 do not need to be adjacent to one another.

The processing device 104 in FIGS. 1A-1C is further configured to calculate a plurality of navigation sub-solutions, wherein each navigation sub-solution of the plurality of navigation sub-solutions is calculated with at least one different subset 114, 116, 118, 120 of the plurality of subsets 114, 116, 118, 120 excluded. That is, a navigation sub-solution of the plurality of navigation sub-solutions is calculated by excluding at least one subset 114, 116, 118, 120 of the plurality of subsets 114, 116, 118, 120 and calculating a navigation solution with the satellites 110 in the remaining (un-excluded) subsets 114, 116, 118, 120. At least one different subset 114, 116, 118, 120 is excluded for each navigation sub-solution. Thus, to calculate a plurality of navigation sub-solutions, the process of excluding at least one subset 114, 116, 118, 120 and calculating a navigation solution using the satellites in the remaining subsets 114, 116, 118, 120 is repeated, excluding at least one different subset 114, 116, 118, 120 for each navigation sub-solution until navigation sub-solutions have been calculated for all the combinations of at least one subset 114, 116, 118, 120 excluded.

The number of satellites 110 excluded when calculating a plurality of navigation sub-solutions can be based on the number of faults that are being protected against. For example, if one fault is being protected against, one subset 114, 116, 118, 120 can be excluded for each navigation sub-solution. If two faults are being protected against, a first set of navigation sub-solutions can be calculated with one subset 114, 116, 118, 120 excluded and a second set of navigation sub-solutions can be calculated with two subsets 114, 116, 118, 120 excluded for each navigation sub-solution. The first set of navigation sub-solutions and the second set of navigation sub-solutions can then be combined to form the complete set of navigation sub-solutions for a two fault scenario.

For example, referring to FIG. 1C, if up to two faults were to be considered based on the four subsets of 114, 116, 118, and 120, a first set of navigation sub-solutions would be calculated using the following groups of subsets 114, 116, 118, subsets 114, 116, 120, subsets 114, 118, 120, and subsets 116, 118, 120, to account for one fault and a second set of navigation sub-solutions would be calculated using the following groups of subsets 114, 116, subsets 114, 118, subsets 114, 120, subsets 116, 118, subsets 116, 120, and subsets 118, 120 to account for two faults. The combination of the first set of navigation sub-solutions and the second set of navigation sub-solutions would result in a total of ten navigation sub-solutions to account for the two faults. As discussed above, in some examples, the number of required sub-solutions is independent of the number of visible satellites and is instead dependent on the number of subsets 114, 116, 118, 120.

Since an entire subset 114, 116, 118, 120 is excluded for a navigation sub-solution, a single navigation sub-solution can protect from several different fault modes since multiple satellites within one subset 114, 116, 118, 120 can become faulty and the navigation sub-solution covers all such cases. Therefore, the total number of computed navigation sub-solutions is reduced. The number of faults covered by a navigation sub-solution will depend on the size of the subsets 114, 116, 118, 120 and how many of the subsets 114, 116, 118, 120 are removed when computing the navigation sub-solutions.

The processing device 104 in FIGS. 1A-1C is further configured to calculate a protection level. A protection level is a statistical bound to the position error of a position that is calculated using the satellites 110. Examples of protection levels are the horizontal protection level (HPL) and the vertical protection level (VPL). The HPL is the radius of a circle in the horizontal plane with its center being at the true position, which describes the region assured to contain the indicated horizontal position of an aircraft and provides a bound on the horizontal position of the aircraft with a probability derived from the integrity requirement. The VPL is half the length of a segment on the vertical axis with its center being at the true position, which describes the region that is assured to contain the indicated vertical position of the aircraft and provides a bound on the vertical position of the aircraft with a probability derived from the integrity requirement.), HPL and VPL can be calculated using methods known to one having skill in the art. For example, the HPL and VPL can be calculated based on satellite geometry given by a measurement observation matrix (H) and based on the noise factor given by a weighting factor matrix (W).

While several different fault modes can be accounted for in a single navigation sub-solution, it is possible that some healthy satellites are removed, as well. However, removing some healthy satellites (i.e. useful measurements) adversely affects the protection level (e.g., the VPL, the HPL, etc.). This shortcoming can be countered by modifying the number of subsets 114, 116, 118, 120 that the plurality of satellites 110 are divided into. As a result, it is possible to trade-off performance versus computational load based on the specific needs of each case. For example, if the computational performance of dividing the plurality of satellites 110 into four subsets 114, 116, 118, 120 is not sufficient, the number of subsets 114, 116, 118, 120 can be decreased to satisfy the required computational performance, so that fewer navigation sub-solutions will need to be computed for the same amount of faults required. Or, in some embodiments, if a protection level is met, but a reduction in the computational load is desired, the number of subsets 114, 116, 118, 120 can similarly be decreased. On the contrary, if the computational performance is satisfied, but the processing device 104 is further configured to calculate a protection level and the protection level is above a threshold, the number of satellites 110 included in each subset 114, 116, 118, 120 can be reduced or the number of subsets 114, 116, 118, 120 increased or both. In some embodiments, this can be a dynamic iterative process by the processing device 104 until the integrity of the navigation sub-solutions and the protection level is met. However, in some embodiments where the integrity and protection level cannot be met, an alarm can be triggered to notify the operator of the receiver that the protection level is above a threshold. As an example, an alarm level is set to 100 meters. If the calculated protection level is 85 meters, the processing device will not trigger the alarm. However, if the calculated protection level is 110 meters, the processing device can be configured to trigger the alarm and notify the flight crew.

Furthermore, in some embodiments, the processing device 104 is configured to determine whether at least one subset 114, 116, 118, 120 of the plurality of subsets 114, 116, 118, 120 includes a fault. In exemplary embodiments, the processing device 104 can be configured to determine whether at least one subset 114, 116, 118, 120 of the plurality of subsets 114, 116, 118, 120 includes a fault using the solution separation method, as known to one having skill in the art, wherein the sub-solutions used for the solution separation method are a plurality of sub-solutions calculated by respectively excluding at least one subset 114, 116, 118, 120 in a manner as discussed above. That is, in an exemplary embodiments, a difference is computed between a full navigation solution using all the satellites 110 and each of the navigation sub-solutions for each of the subsets 114, 116, 118, 120. If the difference is greater than a threshold, a fault can be determined to be present in the full navigation solution.

The processing device 104 can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The processing device 104 can also include functions with software programs, firmware, or other computer readable instructions for carrying out various process tasks, calculations, and control functions used in the present embodiments.

The memory device 106 can be any appropriate tangible and non-transitory processor readable medium used for storage of processor readable instructions or data structures. Suitable processor readable media can include tangible media such as magnetic or optical media. For example, tangible media can include physical devices such as, but not limited to a conventional hard disk, compact disk (e.g., read only or re-writable), volatile or non-volatile media such as random access memory (RAM) including, but not limited to, synchronous dynamic random access memory (SDRAM), double data rate (DDR) RAM, RAMBUS dynamic RAM (RDRAM), static RAM (SRAM), etc.), read only memory (ROM), electrically erasable programmable ROM (EEPROM), and flash memory, etc.

Figure 2:
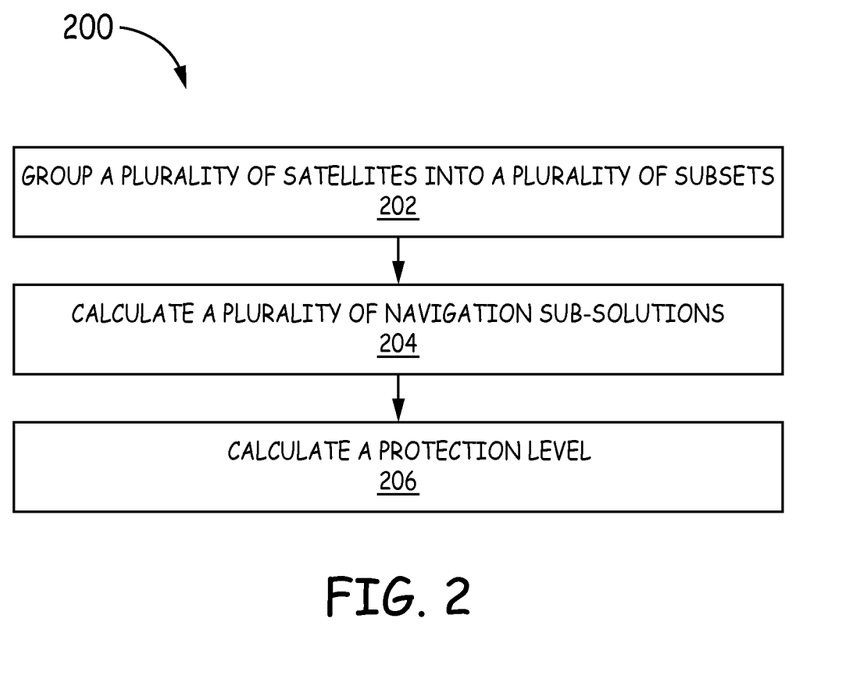
FIG. 2 is a flow diagram of an example method for satellite subset selection for use in monitoring the integrity of computed navigation solutions.

FIG. 2 is a flow diagram of an example method 200 for satellite subset selection for use in monitoring the integrity of computed navigation solutions. The method 200 comprises grouping a plurality of satellites in view of the GNSS receiver into a plurality of subsets, wherein a satellite of the plurality of satellites is included in at most one subset of the plurality of subsets, wherein each subset of the plurality of subsets includes at least one satellite of the plurality of satellites and less than all satellites of the plurality of satellites, and wherein at least one subset includes more than one satellite (block 202). In some embodiments, the plurality of satellites and the plurality of subsets can have some or all of the same characteristics of the plurality of satellites 110 and the plurality of subsets 114, 116, 118, 120 discussed above in FIGS. 1A-1C. For example, in some embodiments, the plurality of satellites include satellites from more than one constellation (e.g., GPS, GLONASS, Galileo, BeiDou).

The plurality of satellites can be grouped by dividing the satellites into more than one subset such that each subset 114, 116, 118, 120 includes at least one satellite 110, less than the total number of satellites 110 in the plurality of satellites 110, and at least one subset includes more than one satellite, wherein each satellite 110 is included in at most one subset 114, 116, 118, 120. In some embodiments, grouping the plurality of satellites into the plurality of subsets includes selecting an equal number of satellites for each subset if the number of subsets in the plurality of subsets is a divisor of the number of satellites in the plurality of satellites. In other embodiments, grouping the plurality of satellites into the plurality of subsets includes dividing the plurality of satellites into the plurality of subsets, wherein each subset of the plurality of subsets includes neither two more satellites nor two less satellites than another subset of the plurality of subsets.

Method 200 further comprises calculating a plurality of navigation sub-solutions, wherein each navigation sub-solution of the plurality of navigation sub-solutions is calculated with at least one distinct subset of the plurality of subsets excluded (block 204). In some exemplary embodiments, calculating a plurality of navigation sub-solutions using the plurality of subsets can be done in the same or a similar manner as discussed above in FIGS. 1A-1C. That is, a navigation sub-solution of the plurality of navigation sub-solutions is calculated by excluding at least one subset of the plurality of subsets and calculating a navigation solution with the satellites in the remaining (un-excluded) subsets. At least one different subset is excluded for each navigation sub-solution. Thus, to calculate a plurality of navigation sub-solutions, the process of excluding at least one subset and calculating a navigation solution using the satellites in the remaining subsets is repeated, excluding at least one different subset for each navigation sub-solution until navigation sub-solutions have been calculated for all the combinations of at least one subset excluded. In addition, a full navigation solution can be calculated using all the satellites in the plurality of satellites.

Similar to above, the number of satellites excluded when calculating a plurality of navigation sub-solutions can be based on the number of faults that are being protected against. For example, if one fault is being protected against, one subset can be excluded for each navigation sub-solution. If two faults are being protected against, a first set of navigation sub-solutions can be calculated with one subset excluded and a second set of navigation sub-solutions can be calculated with two subsets excluded for each navigation sub-solution. The first set of navigation sub-solutions and the second set of navigation sub-solutions can then be combined to form the complete set of navigation sub-solutions for a two fault scenario.

Method 200 can further comprise calculating a protection level (e.g., the VPL, the HPL, etc.) (block 206). Calculating a VPL and a HPL can be done according to methods known to one having skill in the art and as discussed above. If the protection level is above a threshold, the method 200 can further comprise increasing the number of subsets. Furthermore, method 200 can further comprise triggering an alarm if a protection level is above a threshold.

In some embodiments, method 200 further comprises determining whether a subset of the plurality of subsets includes a fault if the protection level is above a threshold. Similarly, in some exemplary embodiments, determining whether a subset of the plurality of subsets includes a fault can be done in the same or a similar manner as discussed above in FIGS. 1A-1C. For example, in some exemplary embodiments, determining whether a subset includes a fault can include computing a difference between a full navigation solution using all the satellites and each of the navigation sub-solutions for each of the subsets. If the difference is greater than a threshold, a fault can be determined to be present in the full navigation solution.

One or more actions described in the present methods can be implemented by computer executable instructions, such as program modules or components, which are executed by at least one processor. Generally, program modules include routines, programs, objects, data components, data structures, algorithms, and the like, which perform particular tasks or implemented particular abstract data types.

Instructions for carrying out the various process tasks, calculations, and generation of other data used in operation of the methods described herein can be implemented in software, firmware, or other computer- or processor-readable instructions. These instructions are typically stored in any appropriate computer program product that includes a computer readable medium used for storage of computer readable instructions or data structures. Such a computer readable medium can be any available media that can be accessed by a general purpose or special purpose computer or processor, or any programming logic device.

EXAMPLE EMBODIMENTS

Example 1 includes a Global Navigation Satellite System (GNSS) receiver comprising: a processing device configured to: group a plurality of satellites in view of the GNSS receiver into a plurality of subsets, wherein a satellite of the plurality of satellites is included in at most one subset of the plurality of subsets, wherein each subset of the plurality of subsets includes at least one satellite of the plurality of satellites and less than all satellites of the plurality of satellites, and wherein at least one subset includes more than one satellite; calculate a plurality of navigation sub-solutions, wherein each navigation sub-solution of the plurality of navigation sub-solutions is calculated with at least one different subset of the plurality of subsets excluded; and calculate a protection level.

Example 2 includes the receiver of Example 1, wherein the processing device is further configured to: calculate a full navigation solution using all satellites of the plurality of satellites.

Example 3 includes the receiver of Example 2, wherein the processing device is further configured to determine whether the protection level is above an alert limit, and if the protection level is above the threshold provide an alert.

Example 4 includes the receiver of any of Examples 2 or 3, wherein the processing device is further configured to determine whether a subset of the plurality of subsets includes a fault based on whether a difference between a navigation sub-solution that is calculated with the subset excluded and the full navigation solution is greater than a threshold.

Example 5 includes the receiver of any of Examples 1-4, wherein the processing device is further configured to: increase the number of subsets if the protection level is above a threshold.

Example 6 includes the receiver of any of Examples 1-5, wherein group a plurality of satellites into a plurality of subsets includes equally divide the plurality of satellites into the plurality of subsets if the number of subsets in the plurality of subsets is a divisor of the number of satellites in the plurality of satellites.

Example 7 includes the receiver of any of Examples 1-6, wherein the plurality of satellites are from more than one constellation of satellites.

Example 8 includes a method for satellite subset selection, the method comprising: grouping a plurality of satellites in view of the GNSS receiver into a plurality of subsets, wherein a satellite of the plurality of satellites is included in at most one subset of the plurality of subsets, wherein each subset of the plurality of subsets includes at least one satellite of the plurality of satellites and less than all satellites of the plurality of satellites, and wherein at least one subset includes more than one satellite; calculating a plurality of navigation sub-solutions, wherein each navigation sub-solution of the plurality of navigation sub-solutions is calculated with at least one different subset of the plurality of subsets excluded; and calculating a protection level.

Example 9 includes the method of Example 8, further comprising: calculating a full navigation solution using all satellites of the plurality of satellites.

Example 10 includes the method of Example 9, further comprising: determining whether the protection level is above an alert limit, and if the protection level is above the threshold provide an alert.

Example 11 includes the method of any of Examples 9 or 10, further comprising: determining whether a subset of the plurality of subsets includes a fault based on whether a difference between a navigation sub-solution that is calculated with the subset excluded and the full navigation solution is greater than a threshold.

Example 12 includes the method of any of Examples 8-10, further comprising: increasing the number of subsets if the protection level is above a threshold.

Example 13 includes the method of any of Examples 8-12, wherein grouping a plurality of satellites into a plurality of subsets includes equally dividing the plurality of satellites into the plurality of subsets if the number of subsets in the plurality of subsets is a divisor of the number of satellites in the plurality of satellites.

Example 14 includes the method of any of Examples 8-13, wherein the plurality of satellites are from more than one constellation of satellites.

Example 15 includes a non-transitory computer-readable medium having computer-executable instructions stored thereon which, when executed by one or more processors, cause the one or more processors to perform the steps of: grouping a plurality of satellites in view of the GNSS receiver into a plurality of subsets, wherein a satellite of the plurality of satellites is included in at most one subset of the plurality of subsets, wherein each subset of the plurality of subsets includes at least one satellite of the plurality of satellites and less than all satellites of the plurality of satellites, and wherein at least one subset includes more than one satellite; calculating a plurality of navigation sub-solutions, wherein each navigation sub-solution of the plurality of navigation sub-solutions is calculated with at least one different subset of the plurality of subsets excluded; and calculating a protection level.

Example 16 includes the non-transitory computer-readable medium of Example 15, wherein the instructions cause the one or more processor to calculate a full navigation solution using all satellites of the plurality of satellites.

Example 17 includes the non-transitory computer-readable medium of Example 16, wherein the instructions cause the one or more processors to determine whether the protection level is above an alert limit, and if the protection level is above the threshold provide an alert.

Example 18 includes the non-transitory computer-readable medium of any of Examples 14 or 15, wherein the instructions cause the one or more processors to determine whether a subset of the plurality of subsets includes a fault based on whether a difference between a navigation sub-solution that is calculated with the subset excluded and the full navigation solution is greater than a threshold.

Example 19 includes the non-transitory computer-readable medium of any of Examples 15-17, wherein the instructions cause the one or more processors to increase the number of subsets if the protection level is above a threshold.

Example 20 includes the non-transitory computer-readable medium of any of Examples 15-19, wherein group a plurality of satellites into a plurality of subsets includes equally divide the plurality of satellites into the plurality of subsets if the number of subsets in the plurality of subsets is a divisor of the number of satellites in the plurality of satellites.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A Global Navigation Satellite System (GNSS) receiver comprising:
    a processing device configured to:
       group a plurality of GNSS satellites in view of the GNSS receiver into a plurality of subsets, wherein each GNSS satellite of the plurality of GNSS satellites is included in at most one subset of the plurality of subsets, wherein each subset of the plurality of subsets includes:
          at least one GNSS satellite of the plurality of GNSS satellites; and
          fewer than all GNSS satellites of the plurality of GNSS satellites; and
       wherein at least one subset includes:
          more than one GNSS satellite;
       calculate a full navigation solution using all GNSS satellites of the plurality of GNSS satellites;
       calculate a plurality of navigation sub-solutions, wherein each navigation sub-solution of the plurality of navigation sub-solutions is calculated with at least one different subset of the plurality of subsets excluded, wherein the quantity of navigation sub-solutions to be computed is reduced by excluding at a subset level rather than excluding at a satellite level, wherein the quantity of subsets in the plurality of subsets is selected to balance increased performance provided by more subsets with decreased computational load provided by fewer subsets; and
       calculate a protection level based on the full navigation solution and the plurality of navigation sub-solutions.

2. The GNSS receiver of claim 1, wherein the processing device is further configured to:
    determine whether the protection level is above an alert limit; and
    provide an alert if the protection level is above the threshold.

3. The GNSS receiver of claim 2, wherein the processing device is further configured to:
    determine whether a subset of the plurality of subsets includes a fault based on whether a difference between a navigation sub-solution that is calculated with the subset excluded and the full navigation solution is greater than a threshold.

4. The GNSS receiver of claim 1, wherein the processing device is further configured to:

increase the number of subsets if the protection level is above a threshold.

5. The GNSS receiver of claim 1, wherein group a plurality of GNSS satellites into a plurality of subsets includes equally divide the plurality of GNSS satellites into the plurality of subsets if the number of subsets in the plurality of subsets is a divisor of the number of GNSS satellites in the plurality of GNSS satellites.

6. The GNSS receiver of claim 1, wherein the plurality of GNSS satellites are from more than one constellation of GNSS satellites.

7. A method for Global Navigation Satellite System (GNSS) satellite subset selection, the method comprising:
grouping a plurality of GNSS satellites in view of a GNSS receiver into a plurality of subsets, wherein each GNSS satellite of the plurality of GNSS satellites is included in at most one subset of the plurality of subsets, wherein each subset of the plurality of subsets includes:
at least one GNSS satellite of the plurality of GNSS satellites; and
fewer than all GNSS satellites of the plurality of GNSS satellites; and
wherein at least one subset of the plurality of subsets includes:
more than one GNSS satellite;
calculating a full navigation solution using all GNSS satellites of the plurality of GNSS satellites;
calculating a plurality of navigation sub-solutions, wherein each navigation sub-solution of the plurality of navigation sub-solutions is calculated with at least one different subset of the plurality of subsets excluded, wherein the quantity of navigation sub-solutions to be computed is reduced by excluding at a subset level rather than excluding at a satellite level, wherein the quantity of subsets in the plurality of subsets is selected to balance increased performance provided by more subsets with decreased computational load provided by fewer subsets; and
calculating a protection level based on the full navigation solution and the plurality of navigation sub-solutions.

8. The method of claim 7, further comprising:
determining whether the protection level is above an alert limit; and
providing an alert if the protection level is above the threshold.

9. The method of claim 7, further comprising:
determining whether a subset of the plurality of subsets includes a fault based on whether a difference between a navigation sub-solution that is calculated with the subset excluded and the full navigation solution is greater than a threshold.

10. The method of claim 7, further comprising:
increasing the number of subsets if the protection level is above a threshold.

11. The method of claim 7, wherein grouping a plurality of GNSS satellites into a plurality of subsets includes equally dividing the plurality of GNSS satellites into the plurality of subsets if the number of subsets in the plurality of subsets is a divisor of the number of GNSS satellites in the plurality of GNSS satellites.

12. The method of claim 7, wherein the plurality of GNSS satellites are from more than one constellation of GNSS satellites.

13. A non-transitory computer-readable medium having computer-executable instructions stored thereon which, when executed by one or more processors, cause the one or more processors to:
group a plurality of Global Navigation Satellite System (GNSS) satellites in view of a GNSS receiver into a plurality of subsets, wherein each GNSS satellite of the plurality of GNSS satellites is included in at most one subset of the plurality of subsets, wherein each subset of the plurality of subsets includes:
at least one GNSS satellite of the plurality of GNSS satellites; and
fewer than all GNSS satellites of the plurality of GNSS satellites; and
wherein at least one subset of the plurality of subsets includes:
more than one GNSS satellite;
calculate a full navigation solution using all GNSS satellites of the plurality of GNSS satellites;
calculate a plurality of navigation sub-solutions, wherein each navigation sub-solution of the plurality of navigation sub-solutions is calculated with at least one different subset of the plurality of subsets excluded, wherein the quantity of navigation sub-solutions to be computed is reduced by excluding at a subset level rather than excluding at a satellite level, wherein the quantity of subsets in the plurality of subsets is selected to balance increased performance provided by more subsets with decreased computational load provided by fewer subsets; and
calculate a protection level based on the full navigation solution and the plurality of navigation sub-solutions.

14. The non-transitory computer-readable medium of claim 13, wherein the instructions cause the one or more processors to:
determine whether the protection level is above an alert limit; and
provide an alert if the protection level is above the threshold.

15. The non-transitory computer-readable medium of claim 13, wherein the instructions cause the one or more processors to:
determine whether a subset of the plurality of subsets includes a fault based on whether a difference between a navigation sub-solution that is calculated with the subset excluded and the full navigation solution is greater than a threshold.

16. The non-transitory computer-readable medium of claim 13, wherein the instructions cause the one or more processors to:
increase the number of subsets if the protection level is above a threshold.

17. The non-transitory computer-readable medium of claim 13, wherein group a plurality of GNSS satellites into a plurality of subsets includes equally divide the plurality of GNSS satellites into the plurality of subsets if the number of subsets in the plurality of subsets is a divisor of the number of GNSS satellites in the plurality of GNSS satellites.

18. The GNSS receiver of claim 1, wherein the processing device is configured to:
protect against one GNSS fault by being configured to calculate:
the plurality of navigation sub-solutions with one different subset of the plurality of subsets excluded;
protect against two GNSS faults by being configured to calculate:
a first set of navigation sub-solutions with one subset of the plurality of subsets excluded; and
a second set of navigation sub-solutions with two subsets of the plurality of subsets excluded.

19. The method of claim 7, further comprising:
protecting against one GNSS fault by calculating the plurality of navigation sub-solutions with one different subset of the plurality of subsets excluded;
protecting against two GNSS faults by calculating:
  a first set of navigation sub-solutions with one subset of the plurality of subsets excluded; and
  a second set of navigation sub-solutions with two subsets of the plurality of subsets excluded.

20. The non-transitory computer-readable medium of claim 13, wherein the instructions cause the one or more processors to:
  protect against one GNSS fault by being configured to calculate:
    the plurality of navigation sub-solutions with one different subset of the plurality of subsets excluded;
  protect against two GNSS faults by being configured to calculate:
    a first set of navigation sub-solutions with one subset of the plurality of subsets excluded; and
    a second set of navigation sub-solutions with two subsets of the plurality of subsets excluded.

* * * * *